Oct. 17, 1933.　　　　G. RAYMOND　　　　1,930,960
SAFETY DEVICE FOR HIGH PRESSURE VESSELS
Filed Sept. 28, 1931
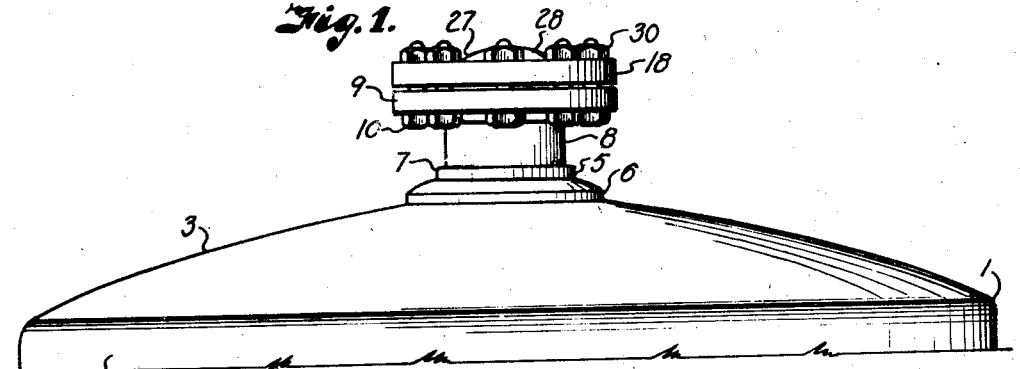
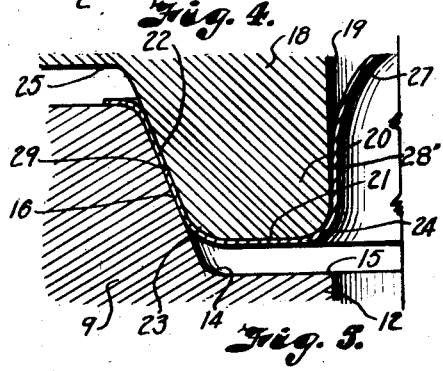
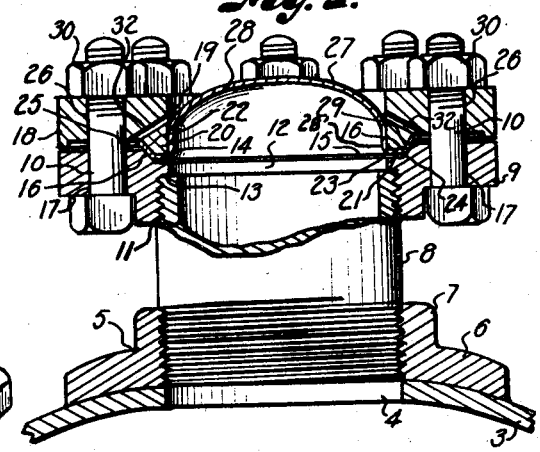
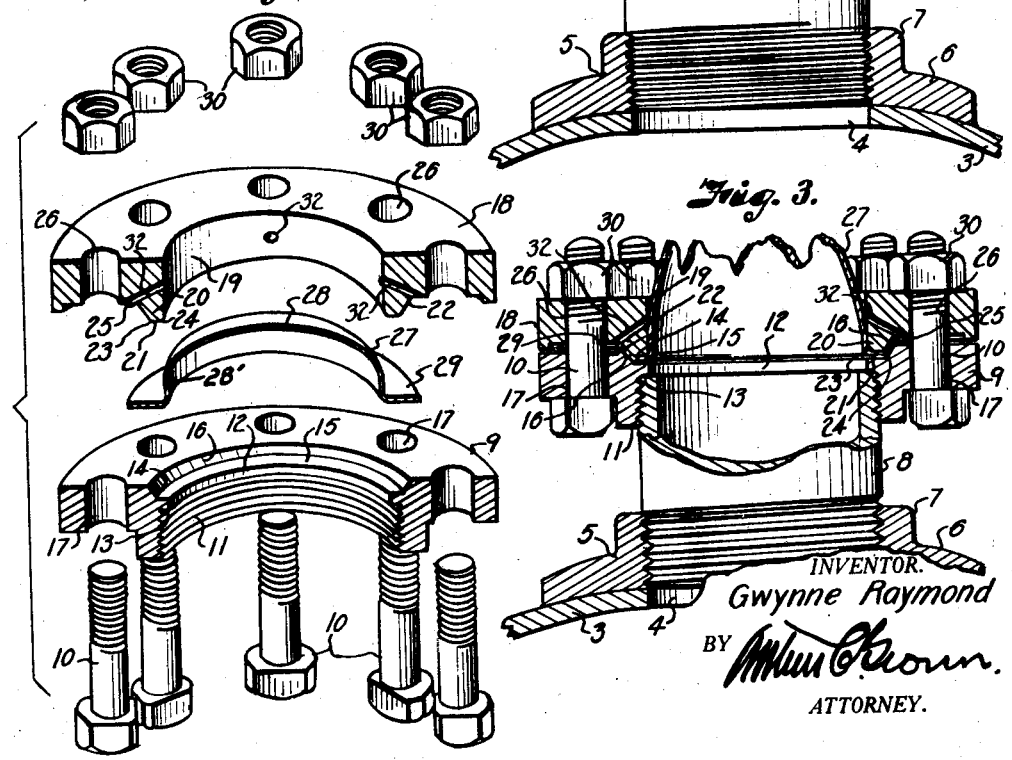
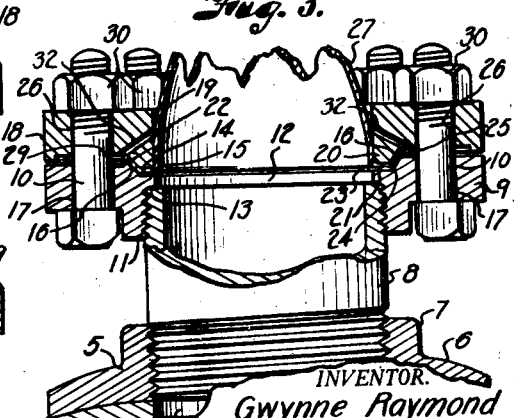
INVENTOR.
Gwynne Raymond
BY
ATTORNEY.

Patented Oct. 17, 1933

1,930,960

UNITED STATES PATENT OFFICE 1,930,960

SAFETY DEVICE FOR HIGH PRESSURE VESSELS

Gwynne Raymond, Kansas City, Mo.

Application September 28, 1931
Serial No. 565,441

15 Claims. (Cl. 220—89)

This invention relates to safety pressure devices frequently referred to as safety heads particularly for use in connection with vessels containing high pressures, for example, oil and gas separators employed for the separation of oil and gas discharged from high pressure wells, and has for its principal objects to provide a reliable safety device that will positively actuate at fixed predetermined pressures and have ample capacity to prevent building up of additional pressure after the device has actuated.

Other important objects of the invention are to provide for free and direct relief of pressure, to prevent the likelihood of causing sparks, to provide for relief of pressure without destructive reactions to the vessel or hazards caused by wildly flying fragments of the safety device after it has operated, and to provide a safety device constructed of a metal which is comparatively free of corrosion and fatigue strains, so that it will operate at its fixed pressure even after a long period of use.

In accomplishing these and other objects of the invention, I have provided improved details of structure, the preferred form of which is illustrated in the accompanying drawing, wherein:

Fig. 1 is an elevational view of the upper end of an oil and gas separator equipped with a safety device constructed in accordance with my invention.

Fig. 2 is a sectional view of the safety device.

Fig. 3 is a similar section through the safety device illustrating operation of the safety blow-out diaphragm.

Fig. 4 is an enlarged detail view illustrating the method of clamping the diaphragm in position.

Fig. 5 is a perspective sectional view of the parts of the safety device shown in spaced relation.

Referring more in detail to the drawing:

1 designates the upper end of a separator of the type used in separating oil and gas discharged from high pressure wells, and includes a vertically positioned cylindrical wall 2 having a dome-shaped head 3 that is provided with an opening 4 communicating with a safety device hereinafter described, and having sufficient capacity to allow free escape of the gas without building up additional pressure within the separator when the safety device functions. The volume of gas delivered to the separators is often very large and the pressures are extremely high, for example, in certain oil fields the separator may be called upon to handle from fifty to one-hundred million cubic feet of gas per day, driven by rock pressure in the neighborhood of twenty-five hundred pounds per square inch. Therefore, the size of opening must be calculated to adequately accommodate such volumes of gas without causing undue back pressure within the separator.

The location of the opening is also important because the sudden release of such high pressures imparts serious reaction to the separator, tending to cause its collapse or upset, and for this reason I prefer to locate the relief opening squarely in the vertical center of the vessel at its highest point, which is, as illustrated, at the top of the head 3. At this point the reaction pressures act in a downward direction, tending to stabilize and support the vessel in its natural position.

The safety device includes a collar 5 that is welded or otherwise secured to the vessel about the opening 4 by means of a lateral flange 6. Formed integrally with the flange 6 is a vertically positioned, internally threaded flange 7 to mount a nipple 8 having an inner diameter substantially equal to the opening 4.

The nipple 8 is externally threaded on its upper end to secure a ring-shaped seat or clamping member 9, and is of sufficient length to permit the passage of fastening devices 10 between the head of the separator and the ring member, as later described.

The ring member 9 has a depending, internally threaded flange 11 to engage the threads of the nipple, and is provided with an inwardly extending peripheral rib 12 forming a stop shoulder 13 at a point above the threads for engaging the end of the nipple to form a tight joint therewith. Formed in the upper face of the ring member circumferentially above the rib 12 is a peripheral seat 14 having a horizontal portion 15 terminating in an upwardly inclined annular wall 16 for a purpose later described. The ring member extends radially beyond the seat and is provided with a series of openings 17.

Associated with the ring seat is a clamping ring 18 having a vertical inner wall 19 aligning with the inner periphery of the seat 14, and having a depending annular clamping or rib portion 20. This clamping portion of the ring corresponds in shape to the seat 14 and includes a flat face portion 21 and an annular inclined face portion 22 having substantially the same angle of inclination as that on the ring 9 previously described. However, the corners 23 and 24 of the ring are carefully rounded, as best shown in Fig. 4. From the clamping portion 20 the lower face of the ring 18 is recessed as at 25 to provide clearance for the surplus metal of the frangible diaphragm later described. The ring is also provided with openings 26 aligning with the openings 17 in the lower ring through which the fastening, such as bolts 10, may be projected to clamp the rings together as later described.

27 designates the frangible diaphragm which normally closes the opening formed by the inner diameter of the rings, but which is adapted to fracture in case of excessive pressure within the separator. This diaphragm is preformed of a relatively light weight, non-corrosive, non-sparkable and ductile metal that may be readily drawn into dome shape, as is illustrated, without placing the material under internal tension that might cause thinning and weak spots that are subject to fracture at pressures below a determined pressure. While various metals having the above characteristics may be employed, I prefer to use pure sheet copper having substantially uniform thickness throughout its area, and I draw the sheet into dome shape by forming dies.

The dome-shaped portion 28 is a shallow dome, namely a dome in which the height thereof is substantially less than the horizontal base radius thereof and, as shown, includes a short wall portion of a suitable diameter to fit snugly within the upper ring, and terminates in a frangible portion that may be semi-elliptical in cross section, that is, the height of the ellipsoidal portion is substantially one-fourth its diameter. The dome is provided with an annular integral anchoring flange 29 which extends from the wall portion in a reverse curve from that of the frangible portion of the dome and extends outwardly in a plane substantially parallel to the major diameter of the dome, and the juncture of the flange with the dome is preferably formed on the same curvature as the rounded portion 24 of the clamping portion of the upper ring in order to avoid sharp break lines on which the diaphragm may tend to fracture. In other words the outer surface portion of the central frangible section or portion of the diaphragm lies or becomes tangent to the rounded portion 24.

The diaphragm may be constructed to disrupt at a predetermined pressure for any diameter of dome by providing metal of proper thickness, the tensile strength of the metal being considered.

In applying the diaphragm it is placed on top of the ring 9 substantially axially of the opening 4. The upper or clamping ring 18 is then sleeved over the dome of the diaphragm, whereupon the bolts 10 are inserted through the aligning openings 17 and 26, and nuts 30 are applied to the bolts. Tightening of the nuts causes the clamping portion 20 to press the lateral flange 29 into the seat 14 in such a manner that its outer edge is turned upwardly and clamped tightly between the inclined surfaces of the rings whereby said lateral flange 29 constitutes a peripheral means for sealing the dome-shaped diaphragm to the means that provides a flow opening that is sealed by the diaphragm until the latter fails by bursting. Before the inner portion of the flange can engage the bottom flat portion 15 of the seat, the bent up part of the flange is tightly wedged, leaving the inner portion of the flange lying freely against the rounded portions 24 of the clamping ring. Thus the diaphragm is retained in position only by the wedging grip of the flanges so that no line of shear is effected in the clamping action since the unclamped portion of the flange is free to follow and be backed by the smooth rounding curves of the clamping ring.

In order to drain off the moisture that may collect between the diaphragm and the upper ring, I have provided inclined channels 32 extending downwardly and outwardly and terminating in the bottom face of the ring adjacent the bolt holes 26, as shown in Figs. 2, 3 and 5. If desired, the diaphragm may be coated with a soft slush oil weatherproofing to counteract any tendency of corrosion.

Due to the wedging action imparted parallel to the surfaces of the bent up portion of the diaphragm, a very tight leak-proof joint is provided, capable of withstanding the necessary pressures without the use of gasket material of any kind. However, to give an additional safety factor the contacting inclined surfaces may be coated with a suitable cement or shellac, if desired.

By constructing the diaphragms as described, they will function at blowout pressures very close to the calculated pressure for which they were designed, so that the separator may operate up to its highest safe working pressure without danger of the diaphragm giving away, but, should safe pressures be exceeded, the diaphragm is certain to operate to relieve the excessive pressure before the bursting pressure of the tank is reached.

When the diaphragms fracture, they seem to fail over the entire area of the dome so that only very small fragments of copper are blown loose and these flutter harmlessly away.

It is also apparent by observing Fig. 3 of the drawing that a free and smooth exit is provided for the relief of the gas and no sparks can be produced by flying rocks and the like discharged from the well.

The device, by being constructed of ductile metal, has ample fatigue resistance and is capable of operating at ordinary working pressures for a long period of time, and capable of withstanding pulsations of the working pressures without having its final bursting pressure seriously altered.

The ring member 9 is sometimes herein referred to as a main member having a portion with a longitudinally extending aperture therethrough. The clamping ring 18 is also sometimes referred to as a clamping member having a portion with a longitudinally extending aperture therethrough. From what has preceded, and from the drawing hereof, it will be clear that the main member 9 has an inclined seat 16 providing what may be referred to as a gripping seat portion, and that the clamping member 18 has an inclined portion 22 providing a gripping seat portion that cooperates with the gripping seat portion 16 previously mentioned. It will also be observed that the diaphragm 27 is a dome shaped diaphragm and that it comprises a dome shaped central frangible portion 28, a gripped seat portion that surrounds the central frangible portion,—to-wit, a portion which is gripped and clamped by and between the gripping seat portions 16 and 22 when the main and clamping member 9 and 18 are forced towards each other and while they are held in clamping position in respect to each other—and an intermediate portion also surrounding the central frangible portion and which provides a section whereby the dome shaped central portions integrally connected to the gripped seating portion just mentioned. It will also be observed that the inclined seat 16 surrounds, but is spaced from the aperture of the member 9, to which this seat corresponds. It will also be noted that the inclined seat 22 surrounds, but is spaced from the aperture of the clamping member 18, whereby there is provided an intermediate supporting portion 20 which serves to support the intermediate section of the diaphragm against the outward pressure to which the interior portion of the diaphragm is subjected. It will also be observed that this support of the intermediate portion of the diaphragm is carried out without said intermediate portion of the diaphragm being subjected to any substantial clamping action, as is clear from an inspection of Fig. 4. The arrangement of the parts is such that the diaphragm is subjected to supporting action only by portions having smooth curves. It is, therefore, not subject to objectionable local cutting or sharp bending.

What I claim and desire to secure by Letters Patent is:

1. A safety device of the character described comprising a fixed clamping ring, a dome-shaped frangible diaphragm having a laterally extending peripheral flange supported on said fixed clamping ring, a movable clamping ring for cooperating with the fixed clamping ring, inclined wedging means associated with said rings to anchor said flange, and means for drawing said rings together to effect wedging action of said wedging means.

2. A safety device of the character described comprising a fixed clamping ring having an inclined peripheral seat portion, a frangible dome-shaped diaphragm having a peripherally extending lateral flange supported on said seat portion, a movable clamping ring having an inclined clamping portion cooperating with said inclined seat portion to wedge the diaphragm flange therebetween, and means for drawing said clamping rings together to effect said wedging action.

3. A safety device of the character described comprising a clamping member having an opening therein, an inclined seat portion spaced from said opening, a frangible dome-shaped diaphragm having a peripherally extending lateral flange supported on said seat portion, a movable clamping member having an inclined clamping portion cooperating with said inclined seat portion to wedge the diaphragm flange therebetween, and means for drawing said clamping rings together to effect said wedging action.

4. A safety device of the character described comprising a clamping member having an opening therein, an inclined seat portion spaced from said opening, a frangible dome-shaped diaphragm having a peripherally extending lateral flange supported on said seat portion, a movable clamping member having a clamping portion including a smooth rounding surface terminating in an inclined surface cooperating with said inclined seat portion to wedge the diaphragm flange therebetween, and means for drawing said clamping rings together to effect said wedging action.

5. A safety device of the character described including a fixed clamping ring having an inclined peripheral gripping portion, a diaphragm having a flanged portion supported on said ring and having an integral frangible dome portion, a movable clamping ring having an inclined peripheral gripping portion cooperating with said gripping portion of the fixed clamping ring to anchor the flanged portion of the diaphragm and having a supporting portion so arranged that the juncture of the flanged portion with the dome portion is supported against bending stresses.

6. A safety device of the character described including a fixed clamping ring having an inclined peripheral gripping portion, a diaphragm having a flanged portion supported by said ring and having an integral frangible dome-shaped portion, a movable clamping ring having a depending annular rib provided with an inclined gripping portion cooperating with the gripping portion of said first-named ring to anchor said flanged portion of the diaphragm and having a supporting portion so arranged that the juncture of the dome portion with the flanged portion is supported against bending stresses.

7. A device of the character described comprising a fixed ring having an inclined seat portion, a dome-shaped diaphragm supported on the inclined seat portion of said fixed ring, a movable ring having an inclined seat portion cooperating with the inclined seat portion of the fixed ring to grip the diaphragm between said seat portions of the respective rings and terminating in a curved supporting portion located radially inwardly in respect to said seat portions and tangentially contacting the diaphragm, and means for securing the movable ring relatively to the fixed ring.

8. In a safety head a dome-shaped diaphragm having peripheral means for sealing the same to means providing a flow opening, said diaphragm in cross section in any plane axial with the opening presenting substantially elliptical curvature with the long axis of the ellipse extending crosswise of the opening, substantially the entire surface of the dome within the aforesaid sealing means being of such material and construction as to promote bursting throughout its entire area, the cross sectional area of the dome just within the aforesaid sealing means being substantially as large as the flow opening.

9. A dome-shaped safety head diaphragm having peripheral means for sealing the same to means providing a flow opening, a cross section of said diaphragm in a plane axially with the opening presenting substantially elliptical curvature with the long axis of the ellipse extending crosswise of the opening, substantially the entire surface of the dome within the aforesaid sealing means being of such material and construction as to promote bursting throughout its entire area, the cross sectional area of the dome just within the aforesaid sealing means being substantially as large as the flow opening.

10. A dome-shaped safety head diaphragm having peripheral means for sealing the same to means providing a flow opening and constructed so as to provide therethrough when the head bursts a flow opening that approximates in area the area of the flow opening of the means to which said safety head is secured, a cross section of said head in a plane axially with the flow opening of the head being substantially elliptical in curvature with the long axis of the ellipse extending across the flow opening of the head, substantially the entire surface of the dome across said flow opening being of frangible ductile material of substantially uniform thickness and constructed to promote bursting throughout its entire area.

11. A safety head having a dome-shaped diaphragm provided with peripheral means for sealing said diaphragm to means providing a flow opening, a cross section of the dome of said diaphragm in a plane axially with the flow opening consisting of a curved central portion bordered by side portions of shorter radius of curvature, said cross section of the dome having at the base thereof a transverse diameter that extends crosswise of the flow opening and having for the height of the dome a dimension that extends axially of the flow opening and that is less than one half of the length of said diameter at the base of the dome, substantially the entire surface of the dome within the aforesaid sealing means being of such material and construction as to promote bursting throughout its entire area, the cross sectional area of the dome within the aforesaid sealing means being substantially of the same size as the flow opening.

12. A safety device of the character described comprising a main member having a portion provided with an aperture therethrough and having a gripping seat surrounding said aperture, a dome shaped diaphragm having a central frangible portion, a surrounding gripped seat portion and an intermediate portion that surrounds the frangible portion and which provides a section that integrally connects said central frangible portion with said gripped seat portion, a clamping member having a portion with an aperture therethrough and having a gripping seat for cooperating with the gripping seat portion of the main member, any innermost cross dimension of said gripping seat portion of the clamping member being larger than the corresponding maximum cross dimension of the aperture of the clamping member, whereby an intermediate supporting section is provided about the aperture of the clamping member for supporting said intermediate portion of the diaphragm and without substantial gripping action being exerted on said intermediate portion of the diaphragm, and means for drawing the main and clamping members towards each other to effect the clamping of the seat portion of the diaphragm between the clamping seat portions of the main and clamping members, the innermost section of the intermediate supporting portion of the clamping member and the adjacent section of the intermediate portion of the diaphragm having surface contours so shaped that the engagement between the surfaces initiates where the surfaces become substantially tangential with each other.

13. A safety device of the character described, comprising a main member having a portion provided with a longitudinally extending aperture therethrough for permitting the outward flow of fluid when excess pressure conditions have been reached and having a gripping seat that surrounds said aperture, a diaphragm having an outwardly bulging central frangible portion the inner face of which is normally engaged by outwardly pressing fluid, an outer gripped seat portion, and an intermediate portion that surrounds the central frangible portion and which provides a section that integrally connects the central frangible portion with the gripped seat portion, a clamping member having a portion with a longitudinally extending aperture therethrough and having a gripping seat portion cooperating with the gripping seat portion of the main member, each innermost cross dimension of said gripping seat portion of the clamping member being larger than the corresponding maximum cross dimension of the aperture of the clamping member whereby an intermediate supporting portion is provided about the aperture of the clamping member for supporting the outer face section of the intermediate portion of the diaphragm and without gripping action being exerted on said intermediate portion of the dome-shaped diaphragm, and means for forcing the clamping members longitudinally towards each other to diaphragm clamping position.

14. In a safety device of the class wherein a diaphragm is secured between apertured members and in which the diaphragm is intended to burst upon a predetermined pressure being reached, the combination of a specially shaped dome-like diaphragm and a specially shaped clamping member, and in which the diaphragm has a central frangible portion, an outer gripped seat portion and an intermediate curved portion, and in which the clamping member has an apertured section that receives the central frangible portion of the diaphragm, by which clamping member the outer gripped seat portion of the diaphragm is clamped and which clamping member has an intermediate supporting portion inwardly located with respect to the gripped seat portion of the diaphragm and by which intermediate supporting portion the intermediate portion of the diaphragm is supported devoid of any substantial clamping effect thereagainst.

15. A safety device of the class wherein a diaphragm is secured between apertured members and in which the diaphragm is intended to burst upon a predetermined pressure being reached, which safety device is characterized by having the diaphragm thereof of shallow dome shape and provided with an outer gripped portion, a central frangible portion and an intermediate portion between the gripped portion and the central frangible portion and by having one of the apertured members provided with clamping means for engaging the gripped portion of the diaphragm and also with means for engaging and supporting the intermediate portion of the diaphragm without clamping the same, which last mentioned means is inwardly disposed with respect to said clamping means.

GWYNNE RAYMOND.